United States Patent
DiMarco et al.

(10) Patent No.: US 9,447,853 B2
(45) Date of Patent: Sep. 20, 2016

(54) COAXIAL ROTARY SHAFT FEEDTHROUGH WITH BACKLASH REDUCTION

(71) Applicant: Technetics Group, LLC, Charlotte, NC (US)

(72) Inventors: Bradley DiMarco, Venice, FL (US); Aaron Glafenhein, Daytona Beach, FL (US)

(73) Assignee: TECHNETICS GROUP, LLC, Charlotte, NC (US)

( * ) Notice: Subject to any disclaimer, the term of this patent is extended or adjusted under 35 U.S.C. 154(b) by 199 days.

(21) Appl. No.: 14/099,724

(22) Filed: Dec. 6, 2013

(65) Prior Publication Data
US 2014/0238159 A1  Aug. 28, 2014

Related U.S. Application Data

(60) Provisional application No. 61/770,790, filed on Feb. 28, 2013, provisional application No. 61/808,811, filed on Apr. 5, 2013.

(51) Int. Cl.
| | |
|---|---|
| F16J 15/54 | (2006.01) |
| F16H 21/14 | (2006.01) |
| F16H 15/54 | (2006.01) |
| F16J 15/52 | (2006.01) |

(52) U.S. Cl.
CPC .............. F16H 15/54 (2013.01); F16H 21/14 (2013.01); F16J 15/525 (2013.01)

(58) Field of Classification Search
CPC .......................... F16H 1/321; F16H 2001/322
USPC ........................................................... 74/18
See application file for complete search history.

(56) References Cited

U.S. PATENT DOCUMENTS

| | | | |
|---|---|---|---|
| 1,441,794 A | 1/1923 | Germain | |
| 2,497,867 A | 2/1950 | Cymmer | |
| 2,770,139 A | 11/1956 | Shen et al. | |
| 2,837,926 A | 6/1958 | Korsgren, Sr. et al. | |
| 3,051,008 A | 8/1962 | Hamren | |
| 3,082,632 A | 3/1963 | Vulliez | |
| 3,306,134 A * | 2/1967 | Winiarski | F16H 1/321 |
| | | | 184/109 |

(Continued)

FOREIGN PATENT DOCUMENTS

NO   WO 2009128723 A1 * 10/2009 ............. F03D 1/008

OTHER PUBLICATIONS

International Search Report and Written Opinion of International Application No. PCT/US2014/018675; Date of Mailing: Jun. 18, 2014; 8 pages.

*Primary Examiner* — William Kelleher
*Assistant Examiner* — Randell J Krug
(74) *Attorney, Agent, or Firm* — Perkins Coie LLP

(57) ABSTRACT

A sealed dual coaxial rotary shaft feedthrough device is provide. The device includes an inner shaft and a hollow outer shaft that is coaxial to encompass the inner shaft. The shafts include coupled drive and driven shafts. The coupling, which may be referred to as an eccentric coupling, causes the driven shaft to rotate with the drive shaft. The rotation is transmitted without breaking the seal by an eccentric portion of either the drive or driven shaft being nutatingly coupled to either a transition cap or transition cup. Nutatingly coupled means rotation of the shaft causes the transition cap or cup to orbit, but not spin, about the longitudinal axis. The nutation is transmitted by the transition cap or cup to the other of the shafts, which rotates.

15 Claims, 18 Drawing Sheets

(56) References Cited

U.S. PATENT DOCUMENTS

| | | | |
|---|---|---|---|
| 3,782,685 A | 1/1974 | Gallagher et al. | |
| 4,136,444 A | 1/1979 | Durney | |
| 4,646,579 A | 3/1987 | Klein | |
| 4,683,763 A | 8/1987 | Balter | |
| 4,885,947 A * | 12/1989 | Balter | F16J 15/525 74/18.1 |
| 5,137,495 A * | 8/1992 | Luebke | B41F 13/0008 403/261 |
| 5,178,024 A * | 1/1993 | Leclaire | F16H 21/14 251/251 |
| 5,243,867 A * | 9/1993 | Polyak | F16J 15/50 74/18 |
| 6,119,537 A | 9/2000 | Jost | |
| 7,788,786 B2 * | 9/2010 | Hewitt | F16C 35/073 29/525.11 |
| 2010/0105487 A1 | 4/2010 | Delaisse et al. | |

\* cited by examiner

COAXIAL ROTARY SHAFT FEEDTHROUGH WITH BACKLASH REDUCTION

CROSS-REFERENCE TO RELATED PATENT APPLICATIONS

The present application claims priority from U.S. Provisional Patent Application No. 61/770,790 titled "Dual Coaxial Sealed Rotary Shaft Feedthrough" by Bradley DiMarco, filed on Feb. 28, 2013, which Provisional Patent Application is hereby incorporated by reference in its entirety as if set out in full, and from U.S. Provisional Patent Application No. 61/808,811, titled "Shaft Rotational Backlash Reduction Methods for Rotary Feedthroughs (Single and Multi-Coaxial types), by Bradley DiMarco, filed on Apr. 5, 2013, which Provisional Patent Application is hereby incorporated by reference in its entirety as if set out in full.

BACKGROUND

In many operating environments, it is often necessary to transmit mechanical force and motion from outside a sealed area to inside the sealed area. For example, semi-conductor manufacturing requires environmentally sealed and clean areas for fabrication of semiconductor waffers, often in a vacuum. The fabrication often requires the rotation of a wafer in a vacuum chamber.

Feedthrough devices have been developed to transmit mechanical force and motion from outside of the sealed area to inside of the sealed area. The feedthroughs allow manipulation of objects and materials inside the sealed chambers while maintaining minimal, and preferably zero, leakage. This eliminates the need to open the chamber to apply motion to devices inside.

Rotary type feedthrough devices provide shaft rotation inside the chamber area while maintaining the integrity of the seal. Single axle rotary feedthrough devices are disclosed in, for example, U.S. Pat. Nos. 1,441,794; 3,782,685; 4,646,579; 4,136,444; 2,497,867; 5,243,867; 3,051,008; 4,885,947; 6,119,537; and 2010/0105487, the disclosures of which are incorporated herein by reference as if set out in full. In some applications, the rotational motion needs to be applied to objects in one or more of the following: a co-rotational direction but at different speeds, a counter rotational direction at the same of different speeds, combinations therein, or the like. To accomplish multiple rotational movements, dual coaxial, hermetically sealed, rotary shaft feedthrough devices have been developed. Dual rotary feedthrough devices are disclosed in, for example, U.S. Pat. Nos. 4,885,947 and 4,683,763, the disclosure of which is incorporated herein by reference as if set out in full.

Generally, conventional dual coaxial rotational feedthrough devices are a higher level manifestation of basic single axis rotary shaft feedthrough devices associated with the above incorporated prior art, which have a long and successful history. More complex modern equipment demands greater degrees of freedom through and into the chambers and all combined in a smaller package. Wide demand is seen in vacuum and semiconductor processing equipment where materials are introduced and processed in complex ways inside sealed chambers requiring movements inside the sealed chamber.

All existing prior art involves using at least two metallic bellows as the outer member. Another single axis feedthrough device is added in series and attached to the metallic bellows in order to add a second shaft. This arrangement has several drawbacks. One drawback includes the fact that the design is long in length, which can cause undesirable moment arms. The length is due in part to combining at least two units together in series. Common length-to-diameter ratios are about 5:1 for this configuration. A second drawback of the existing arrangements includes the complexity and precision required to fabricate devices that work acceptably. Still another drawback includes a cumbersome internal configuration that limits conventional designs in both rotational speed and torque that can be transmitted. Other drawbacks, problems, and deficiencies may exist for current dual coaxial rotary feedthrough devices.

In view of the above, improved coaxial rotary feedthrough devices are desirable.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

The technology of the present application provides an apparatus to transmit mechanical force and motion across a barrier. In particular, the apparatus provides a pair of shafts that are coupled across the barrier. The pair of shafts include a drive shaft and a driven shaft. At least one of the shafts has a longitudinal axis over a majority of the shaft and an offset or eccentric axis at the end coupled to the other of the shafts. The inner drive shaft, at the eccentric axis end, is nutatingly coupled to the driven shaft.

In an aspect, the technology of the present application provides an inner and outer shaft. The inner shaft, which may be hollow or solid, is concentric with an outer hollow shaft. Both the inner shaft and the outer shaft comprise shaft pairs.

In an aspect, the technology of the present application provides a coupling between the drive shaft and the driven shaft using a cup to receive an eccentric portion of a shaft where bearings allow the shaft to rotate within the cup without rotating the cup and the cup is received by a cap where bearings allow the cup to rotate within the cap without rotating the cap and the cap is coupled to the other of the shaft pair.

In an aspect, the technology of the present application provides a barrier. The barrier includes in one embodiment a bellows.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Embodiments are described in more detail below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense. Thus, while the technology of the present application is described with specific reference to transmitting mechanical force and motion across a sealed barrier, the technology may be used in many apparatuses and systems. For example, the technology of the present application may be used to transmit force and motion when it is necessary to maintain separation between different fluids, including gases and liquids. Moreover, the technology may allow for the transmission of mechanical force and motion for systems including volatile or incompatible compounds. The seal also reduces or eliminates leakage from one side of the barrier to the other, which can be important to contain hazardous and dangerous compounds or maintain the purity of the environment.

Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary. The fact that a single exemplary embodiment may be provided and described should not be construed to mean that the single embodiment is the only embodiment.

With reference to FIGS. 1a-1d, a dual coaxial rotary feedthrough device 100 (hereinafter "device 100") is provided. While the technology of the present application are described herein in relation to a dual coaxial rotary feedthrough device, one of ordinary skill in the art on reading the disclosure will now understand that the technology of the present application may include more or less than two coaxial shafts as is described. Thus, the use of the term dual in the following description should not be considered limiting as in certain aspects, the technology of the present application may apply to devices with three (3) or more shafts. Moreover, certain aspects of the technology described herein are applicable to single shaft devices.

Figure 1A:
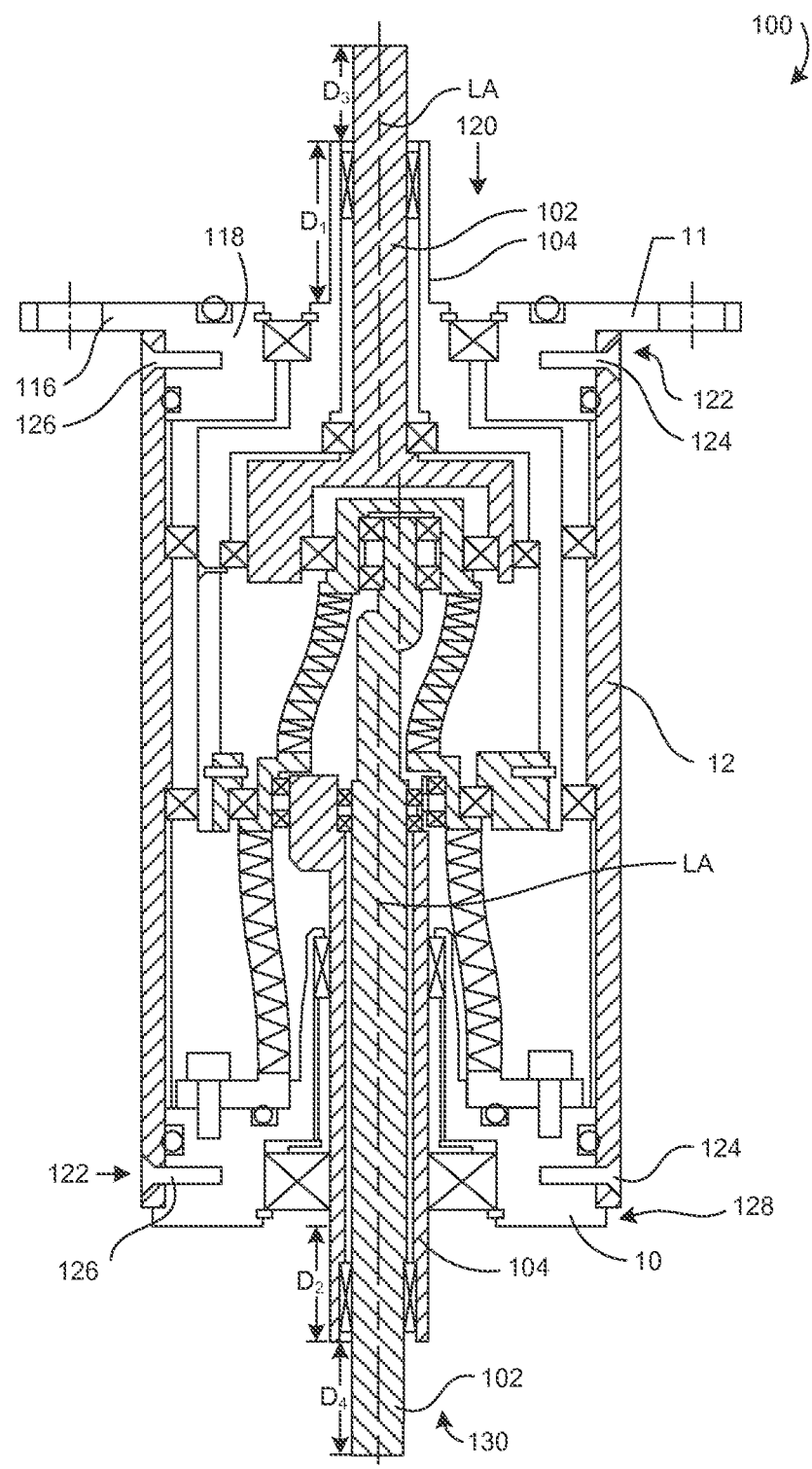
FIGS. 1a-1d depict cross sectional views of a feedthrough consistent with the technology of the present application.
Figure 1B:
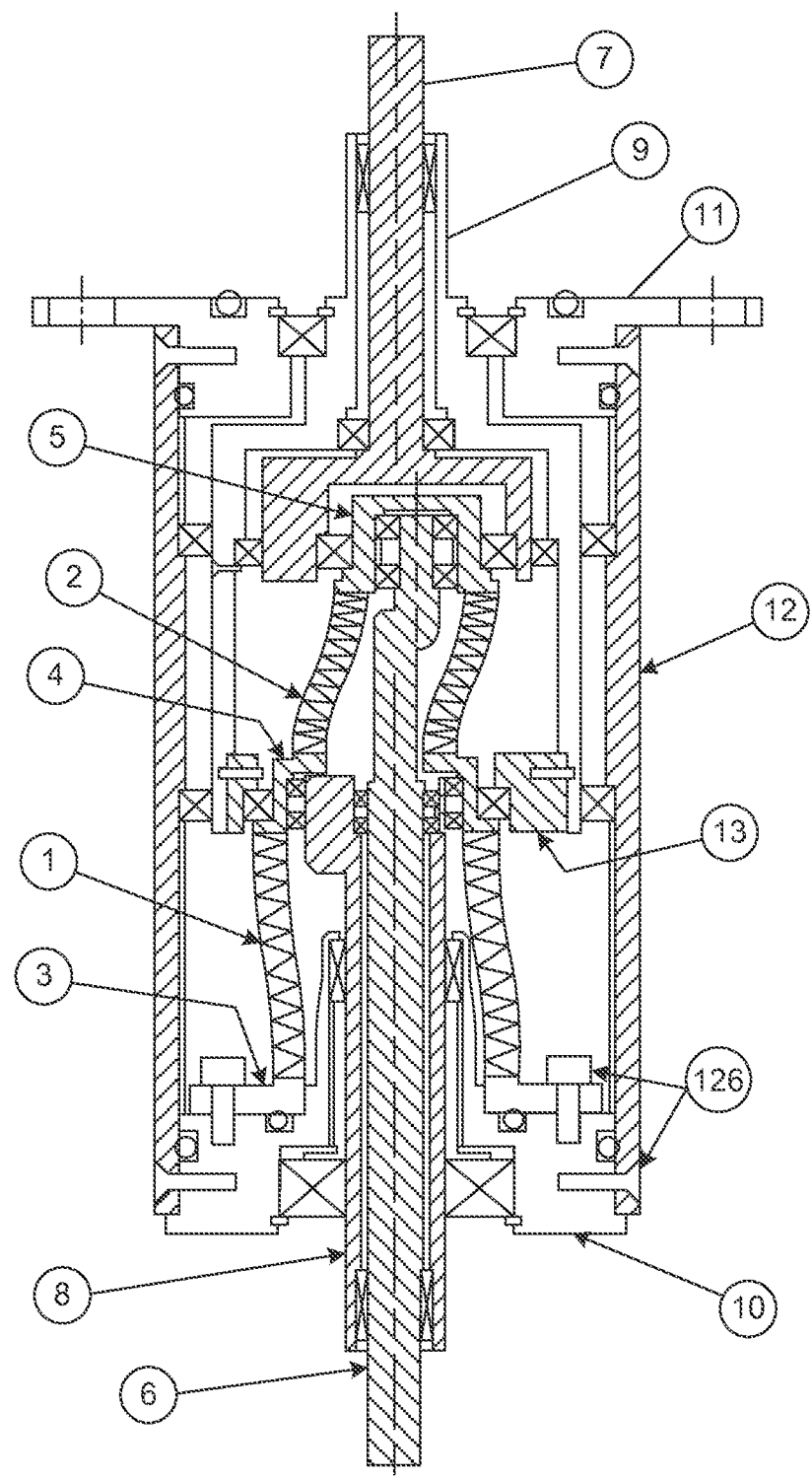
Figure 1C:
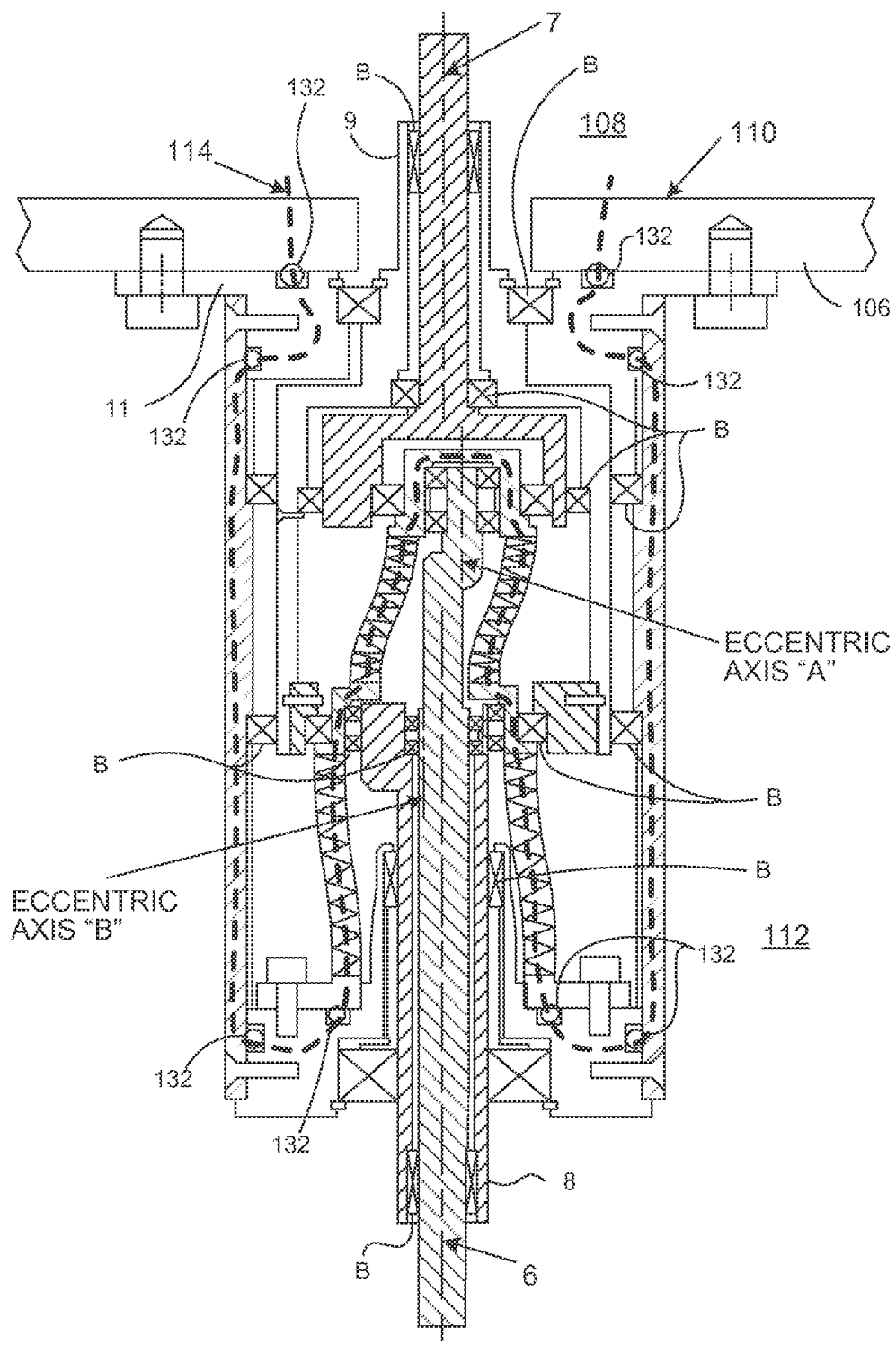
Figure 1D:
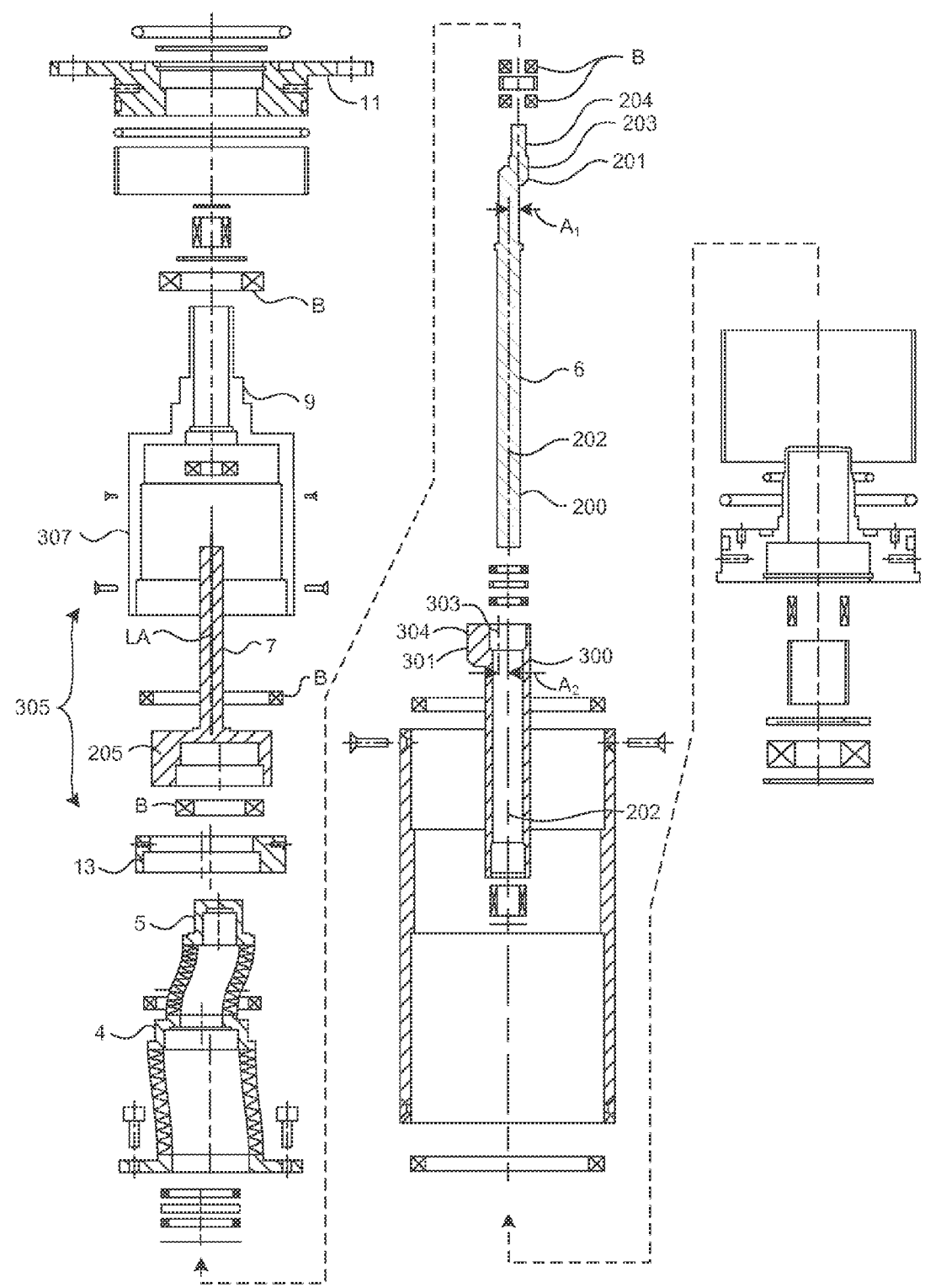

The device 100 provides an inner shaft 102 and an outer shaft 104. As will be explained further below, the inner and outer shafts 102, 104 both comprise a drive and a driven shaft. The drive shafts are coupled to a motive force. The motive force is transferred through the device 100 to each of the driven shafts. Importantly, the inner shaft 102 and the outer shaft 104 rotate independently. With reference to FIG. 1c, the device 100 is shown coupled to a chamber wall 106 via a mounting flange 11. The device 100 comprises a housing 12 coupled to the mounting flange 11 and extending into an environment 112 outside the chamber 110. The inner and outer drive shafts 6 and 8 extend from the device 100 to a point 112 external to the chamber 110. The device 100 provides a barrier 114 between the points 112 external to chamber 110 and the environment 108 internal to the chamber 110. The barrier 114 will be explained further below. The inner and outer driven shafts 7, 9 extend from the housing 12 into the environment 108 internal to the chamber 110.

As shown in FIGS. 1a-1d, the mounting flange 11 includes a radially extending flanged surface 116 extending from a radial base 118 defining a bore 120 about a longitudinal axis LA of the device 100. The housing 12 is a tubular member with an inner diameter that fits over the radial base 118. The housing 12 has mounting bores 122 at both ends of the housing 12. The mounting bores 122 at one end align with mounting bores 124 in the radial base 118. An end cap 10, which may be a flange or plug, is sized to fit within an end 128 of the housing 12 opposite the mounting flange 11. The end cap 10 has mounting bores 124 that align with other mounting bores 122 of the housing 12. Fasteners 126 extend through the mounting bores 122, 124 to couple the housing 12 to both the radial base 118 and the end cap 10. The end cap 10 has a bore 130 extending along the longitudinal axis LA. The fasteners and bores are sealed to each other by static elastomeric seals trapped between them, bonded, adhered, glued, welded, or the like. While shown and described as radially and tubular, the device 100 need not be cylindrical and may be alternative polygon shapes.

Extending from the bores 120 and 130 are the inner and outer shafts 102, 104. The inner shaft 102 may be solid, partially hollow, or completely hollow. The outer shaft 104 is hollow and is positioned around the inner shaft 102. The inner and outer shafts 102, 104 should be arranged concentrically on the longitudinal axis LA.

The outer shaft 104 extends a distance $D_1$ beyond the mounting flange 11 and a distance $D_2$ beyond the end cap 10 to allow the driver and the driven components to be attached to the outer shaft 104. Similarly, the inner shaft 102 extends a distance $D_3$ and $D_4$ beyond the outer shaft 104 ends to allow the driver and driven components to be attached to the inner shaft 102. As can be appreciated, the driver and the driven components for the inner and outer shafts 102, 104 may be the same or different. Also, the distances may be the equal or unequal. In certain embodiments, the inner shaft may be inset such that the distance $D_{1,3}$ is less than the distance $D_{2,4}$. In this case, the inner shaft 102 ends are recessed in the ends of the outer shaft 104. In this case, the drive/driven components would be coupled to the inner shaft 102 by an attachment, such as, for example, a threaded connector, a spline, or the like. Typically a pulley, gear wheel, arm or coupling of some sort would be attached to each shaft independently to transfer the rotation of the shafts in order to do work beyond the device.

As described above, the mounting flange 11 may be statically mounted to the chamber wall 106. To isolate the environment 108, a seal 132 is provided between the mounting flange 11 and the chamber wall 106. The seal may be, for example, an elastomeric O-ring as shown, a metallic seal, or other conventional seals. The internal mechanisms of the device 100 provide the remainder of the barrier 114 to isolate the environment 108 from the environment 112.

With the device 100 mounted to a chamber wall 106, inner and outer driven shafts 7 and 9 extend their respective distances into the environment 108 and allow attachment of and to various devices internal to the sealed chamber volume 108 as stated above. Conversely, the inner and outer drive shafts 6 and 8 extend external to the environment 108 their respective distances into the environment 112. The ends of the inner and outer shafts are concentric and collinear on the longitudinal axis LA.

As can be appreciated, and as will be explained further below, rotation of inner drive shaft 6 results in the same rotation of inner driven shaft 7. Similarly, rotation of outer drive shaft 8 results in the same rotation of outer driven shaft 9. The inner shaft 102 and the outer shaft 104 are separated and aligned by a plurality of bearings B. The bearings B allow for the rotation direction (CW or CCW) and speed of rotation (RPM) of the inner and outer shafts 102, 104 to be independent of the other shaft pair.

Also the function of the device is reversible. In other words, the device 100 may be flipped end for end such that the drive shafts become the driven shafts and vice versa with no change in effect or performance. During all possible combinations of shaft rotations or device orientation the device maintains hermetic level sealing via the internal structure.

The device 100 transmits movement from the drive shafts 6 and 8 to the driven shafts 7 and 9 in a similar fashion. Thus, for ease of reference, the inner shaft 102 will be described from the drive shaft 6 to the driven shaft 7 separately from the outer shaft 104.

The inner shaft 102 has a drive shaft 6. The drive shaft 6 has an inner normal portion 200 and an inner eccentric portion 201. The inner normal portion 200 has a normal longitudinal axis 202 collinear with the longitudinal axis LA of device 100. The inner eccentric portion 201 has an inner eccentric longitudinal axis 203 radially offset from and parallel to the normal longitudinal axis a distance $A_1$. Thus, when the drive shaft 6 is rotated, the inner normal portion 200 rotates about the normal longitudinal axis 202 and the inner eccentric portion 201 and the inner eccentric longitudinal axis rotate about the normal longitudinal axis 202 such that the inner eccentric longitudinal axis orbits the normal longitudinal axis. For purposes of the present application, eccentric generally means that the geometric or longitudinal centerline of one object is parallel to but not collinear with the geometric or longitudinal centerline of another object.

An inner transition end 204 of the inner eccentric portion 201 fits into an inner shaft transition cap 5. The inner eccentric portion 201 is coupled to the inner shaft transition cap 5 by bearings to allow the inner eccentric portion 201 to rotate or spin without transmitting the spin to the inner shaft transition cap 5. The inner shaft transition cap 5 follows the circular motion of the inner eccentric portion 201 of the inner drive shaft 6 without rotating about its axis or spinning. Thus, the inner shaft transition cap 5 is described as nutating. For visualization, but without limitation, nutating may be described, for example, a planet orbiting the sun where the planet does not spin on its own axis.

The inner shaft transition cap 5 operatively fits within an inner shaft transition cup 205. Similarly to the above, the inner shaft transition cap 5 is coupled to the inner shaft transition cup 205 via one or more bearings to allow the inner shaft transition cup 205 to follow the inner shaft transition cap 5 while allowing the inner shaft transition cap 5 to spin relative to the inner shaft transition cup 205. The inner shaft transition cup 205 has a longitudinal axis collinear with the inner eccentric longitudinal axis 203. Thus, the eccentric axis of the inner shaft transition cup 205 nutates about the longitudinal axis LA. The inner shaft transition cup 205 is directly coupled to the inner driven shaft 7. Thus, the nutation of the inner shaft transition cup 205 causes the inner driven shaft 7 to rotate to match the rotation of the inner drive shaft 6. The inner shaft transition cup 205 may or may not be as shown monolithic with the inner driven shaft 7. For visualization, but without limitation, the inner shaft transition cup 205 rotates the inner driven shaft 7 similar to a crank shaft for an old model T Ford or the like.

The outer shaft 104 is comprised of the outer drive shaft 8 and the outer driven shaft 9. The outer drive shaft includes an outer normal portion 300 and an outer eccentric portion 301. The outer normal portion 300 and outer eccentric portion 301 are hollow and sized to fit over or around the inner drive shaft 6. The outer drive shaft 8 is concentrically supported to the inner drive shaft 6 via one or more bearings to allow the outer and inner drive shafts 8, 6 to rotate independently of each other. The outer normal portion 300 has the normal longitudinal axis 202 that is collinear with the longitudinal axis LA of the device 100. The outer eccentric portion 301 has an outer eccentric longitudinal axis 303 radially offset from the normal longitudinal axis a distance $A_2$. Similar to the motion described above with the inner shaft, the outer eccentric portion 301 and the outer eccentric longitudinal axis 303 rotate in a circular motion about the longitudinal axis LA.

An outer transition end 304 of the outer eccentric portion 301 is operatively coupled to the outer transition cap 4, which also operates as a connection point for the two bellows associated with barrier 114 as explained further below. One or more bearings allow the outer eccentric portion 301 to rotate or spin without transmitting the spin to the outer transition cap 4. The outer transition cap 4 nutates with the eccentric portion 301 about the longitudinal axis LA as described above.

The outer shaft transition cap 4 operatively fits within an outer shaft transition cup 305. The outer shaft transition cup 305 is shown as an eccentric ring 13 coupled to extension cylinder 307. The outer shaft transition cap 4 is coupled to the outer shaft transition cup to allow the outer shaft transition cup 305 to follow the outer shaft transition cap 4. Thus, the outer shaft transition cup 305 nutates about the longitudinal axis LA. The outer shaft transition cup 305 is directly coupled to the outer driven shaft 9 via extension cylinder 307 and the nutation of the outer shaft transition cup 305 causes the outer driven shaft to rotate to match the rotation of the outer drive shaft. The extension cylinder 307 is shown monolithic with the outer driven shaft 9.

The inner and outer transition cups 205, 305 are offset or eccentric to match the offset of the eccentric portions of the inner and outer drive shafts 102, 104. Additionally, the eccentrics are shown offset and parallel to the main shaft axis. This is referred to as "radial" or "lateral" offsets in the shaft eccentric couplings from the longitudinal axis. Rather than an eccentric portion of the shaft, the inner and outer shafts may have a protrusion, bulge, tab, or nub to provide a portion of the shaft that is displaced radially to provide a circular driving force. In another embodiment, eccentric component geometries, such as tilted bellows, may provide the radial driving force. Thus, these "angled" offsets may be used to achieve the eccentric driving couplings.

As explained above, the inner transition cap 5 nutates but does not rotate about its axis. Similarly, the outer transition cap 4 nutates but does not rotate about its axis. Thus, a first bellows 1 may extend from the end cap 10 to the outer transition cap 4. Notice, the bellows 1 may be directly welded to the end cap 10 or, alternatively, a bellows flange 3 may be coupled to the end cap 10 to which the bellows 1 is coupled. Bellows is used generically to mean a flexible sealing material. A bellows configuration is preferred, but alternative elastic membranes may be used as well. Also, the bellows is envisioned to be a metallic bellows, but non-metallic bellows of sufficient integrity to maintain the chamber hermetically sealed are possible. As can now be appreciated given the motions described above, the first bellows 1 nutates, but does not spin. Similarly, a second bellows 2 may extend from the outer transition cap 4, or bellows mid flange connection, to the inner transition cap 5, which may be called a bellows end cap. Similarly, the second bellows 2 nutates, but does not spin.

As can now be appreciated, the device 100 functions via two male (cap)/female (cup) eccentrics 201,301/5,4 for transmitting the rotations through from one end to the other end, while two bellows 1, 2 sealed to the transition caps 5, 4 form part of the barrier 114. The two bellows may be metallic or alternative material. Additionally there are several static interfaces between various parts that are shown sealed via elastomeric compression seals (radial or face O-rings). These interfaces could also be of welded or bonded construction to achieve sealing and attachment together if desired. In fact some mating components could be combined into one so as to eliminate the need for sealing together as long as that component could be effectively fabricated and assembled into the device. The moving parts are all supported via various bearings both radially and axially. These bearings could be of any suitable construction (ball, roller, bushing, etc.) to accomplish smooth free rotation of the necessary components. In order to retain position of certain items relative to each other, such as securing a bearing axially in its position, various retaining rings and threaded fasteners are employed. However, other alternate methods such as press fits, bonding agents, or other solutions could be used with equal success.

The inner and outer transition ends 204, 304 of the inner and outer drive shaft 6, 8 are coupled to the inner and outer transition cups 205, 305, which are coupled to the inner and outer driven shafts 7, 9 through a series of coupling devices in the exemplary embodiment. Describing from outside in for either coupling: the inner or outer transition cup, one or more bearings, and the inner or outer transition cap rotationally couple the driven shafts to the inner and outer eccentric portions. For the inner shaft 102, positioned inside the in inner driven shaft 7 at the inner transition cup is a bearing. Positioned inside that bearing is inner transition cap 5, and inside inner transition cap 5 is positioned one or more bearings, and positioned inside the inner bearings is the inner eccentric portion 201. A similar arrangement is seen for the outer drive and driven shafts 8, 9. However, depending on whether included, the outer transition cup includes the eccentric ring 13 as part of the outer transition cup 305. In this case the outer transition cap 4, or bellow flange is seen between the bearings inside it and outside it. Note the transmission path of mechanical coupling of the inner shaft pair and the outer shaft pair. The inner shaft pair, consisting of shaft 6 and 8, are positioned inside of the larger hollow sections of the corresponding components that make up the hollow outer shaft pair. The inner components within the hollow outer components are separated by and supported by various bearings which allows relative rotation of inner versus outer rotating components.

With the above parts being outlined, the operation of device 100 is described. As stated above the inner and outer drive and driven shafts 6, 7, 8, and 9 are coupled respectively via inner and outer eccentric portions 201 and 301 operatively engaged to the inner and outer transition caps 5 and 4, that are operatively coupled to the inner and outer transition cups 205 and 305. The barrier 114 is maintained by a number of seals, such as conventional O-rings as well as the bellows 1 and 2. The couplings, which may generically be referred to as eccentric couplings, allow the drive shafts to transmit rotational force and motion independently to their respective driven shafts.

While the shaft components rotate, the bellows subassembly (which comprise the two bellows 1 and 2 and three flanges 3, 4, and 5) does not itself rotate. As either one of the eccentric couplers rotates, the associated eccentric axis processes around the main axis at a radius equal to the eccentricity of that eccentric. So, for example, assuming the outer shaft pair is held fixed, the base of the small upper bellows is then also fixed in rotation as a result. So, as driver shaft 6 is rotated, its internal male eccentric end orbits and rotates describing a circle of radius "A1" around the main shaft centerline. However, the bellows small end cap flange 5, which is part of the bellows subassembly which is fixed to the non-moving small end cap 10, cannot and does not rotate, but nutates only, as described above. The eccentric couplings provide a rotating and orbiting male eccentric shaft end, with a bearing outside it, with the respective non-rotating but nutating bellows flange outside that, with another bearing outside the bellows flange, and finally with the rotating and orbiting female eccentric shaft end outside that bearing. Additionally, for strength and eventual support to the outer housing, another bearing is positioned outside the female eccentric shaft end. The same mechanism as described for the inner shaft pair and is experienced independently by the outer hollow shaft pair.

The relative rotation between the shafts and the associated bellows flanges results in only a small torque on the associated bellows themselves due to the friction of those bearings as the relative rotation takes place.

In operation, a device of this configuration is designed for a user's specific needs of shaft sizes/lengths of protrusion, rotations speed, and torsion requirements, camber media, pressure to be sealed, and mounting/sealing interface. Driving means are applied to the exterior drive shafts 6,7, and inside the chamber devices or tools are connected to the driven shafts 8,9. The user can then independently rotate either inner or outer shaft CW or CCW at various speeds as desired. Sealing is maintained across the device at all times to up to a hermetic level via barrier 114. The device 100 provides four degrees of freedom of motion (2 independent, 2 dependent) into a sealed chamber 110.

Figure 2:
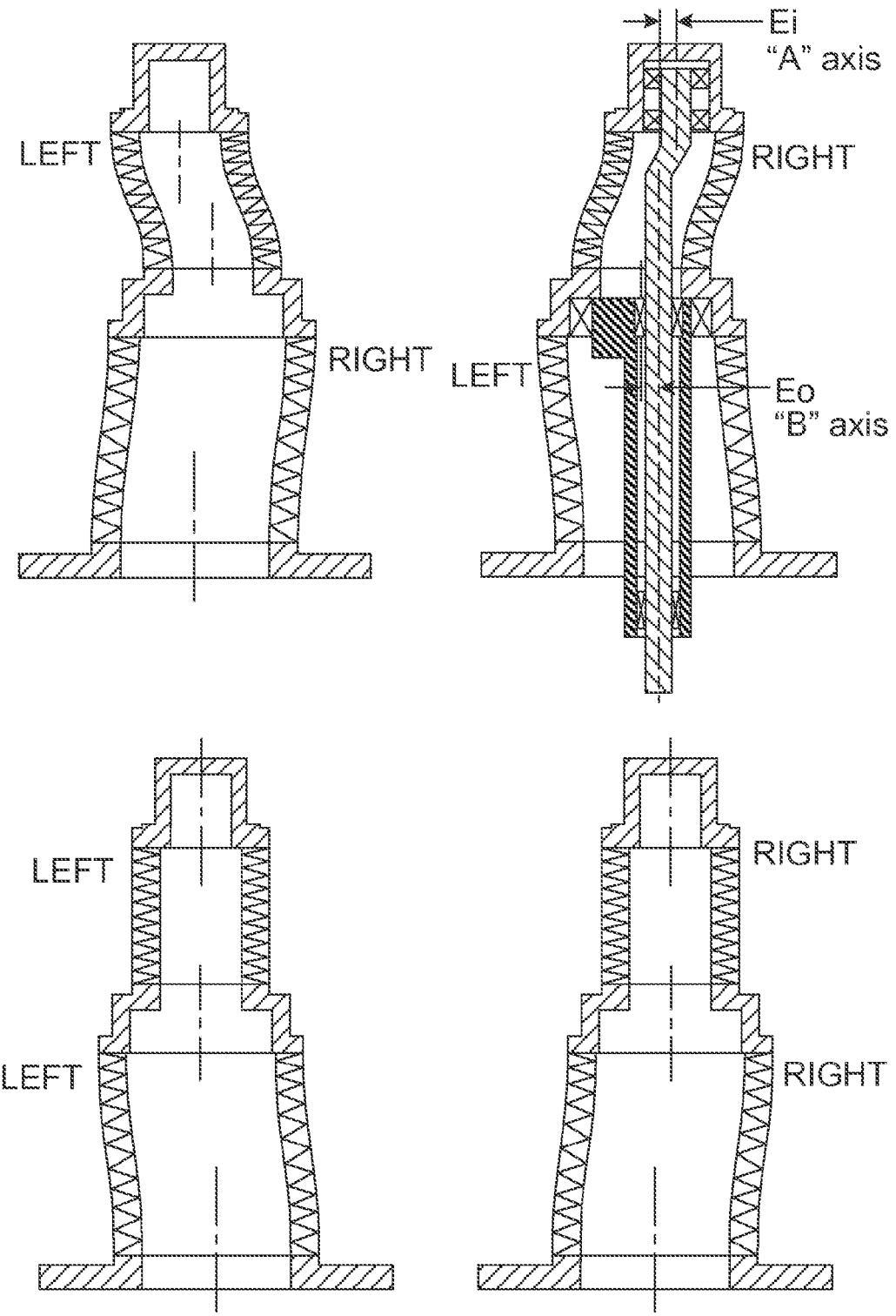
FIG. 2 depicts a cross sectional view of the feedthrough of FIG. 1.

The motion of bellows 1 and 2 is shown in FIG. 2. The bellows 1 is fixed at the end cap 10 and to the outer transition cap 4. The bellows 1 experiences a lateral nutation displacement of Eo at outer transition cap 4. This nutation of bellows 1 is associated with the outer drive and driven shafts 8,9. The nutation motion of the bellows 2 is more complex because the bellows 2 is mounted to the outer transition cap 4, which may be nutating, and to the inner transition cap 5, which also may be nutating. Moreover, the inner and outer transition caps 4, 5 may be nutating in alternative rotational directions and different speeds. These nutations may be in or out of harmony. Thus bellows 2 experiences a net eccentric nutation offset (lateral displacement) which changes depending on the relative positions of the two shaft nutations positions. Thus, the bellows 2 nutation offset is a variable defined by the net combination of the instantaneous rotational positions of both shafts as follows: at maximum offsets when the eccentric portions are displaced 180 degrees out of phase, the net eccentric offset of the bellows 2 may be combination of the offset $A_1+A_2$. The minimum offset would be the absolute value of the offset $|A_1-A_2|$.

It is preferably to provide $A_1 \neq A_2$. While possible, when $A_1=A_2$, the bellows 2 experiences instances where the bellows will be nutating between a max offset of $A_1+A_2$ and a minimum of $A_1-A_2$, which is zero as $A_1=A_2$. If $A_1$ equals $A_2$ the device may experience some drawbacks including lobing and spring rates to name but two drawbacks. When $A_1$ equals $A_2$ the bellows may exhibit a non-linear lateral spring rate curve with a significantly steep initial resistance to initiating lateral displacement from zero lateral displacement to having some lateral displacement. So, as a bellows nutates and experiences lateral displacement that cycles from some positive lateral displacement to a lateral displacement of zero and subsequently back to positive lateral displacement, there may be a non-smooth and undesirable "feel" to the rotation of one or both of the shaft pairs in the device due to the lateral spring rate of the bellows 2 rapidly changing as it cycles through lateral displacement of zero. This condition is not detrimental to the performance of the bellows, but users of the device may require smoother shaft rotation or may not want that "feel". So, it is preferable to make $A_1 \neq A_2$.

Figure 3:
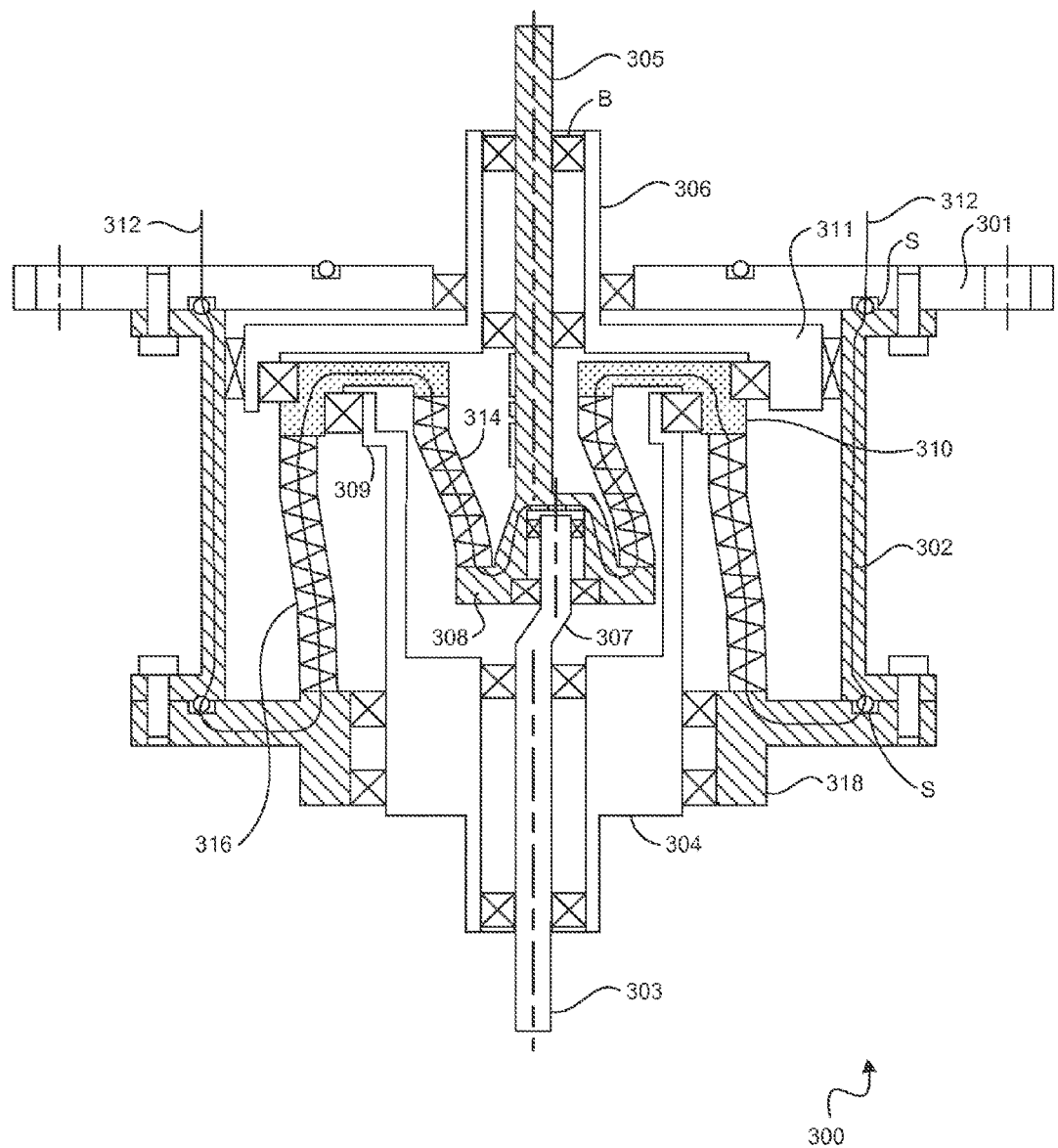
FIG. 3 depicts a cross sectional view of a feedthrough consistent with the technology of the present application.

While the above describes the basic concept the technology of the present application, the above embodiments are exemplary. For example, with reference to FIG. 3, an alternative construction of a dual coaxial rotary feedthrough device 300 (hereinafter "device 300"). The device 300 comprises a housing 302 coupled to the chamber wall 301. The device 300 includes the inner and outer drive shafts 303, 304 as well as inner and outer driven shafts 305, 306. The inner drive shaft 303 includes an eccentric portion 307 that is operatively coupled to an inner transition cup 308, which is directly coupled to the inner driven shaft 305. The outer drive shaft 304 has an eccentric portion 309 at the end that is operatively coupled to the outer transition cap 310. The outer transition cap 310 is operatively coupled to the outer transition cup 311, which is directly coupled to the outer driven shaft 306. The barrier 312 is formed in part by an inner bellows 314 coupled between the inner transition cup 308 and the outer transition cap 310. The outer bellows 316 is coupled to the housing end cap 318 and the outer transition cap 310. The barrier is formed by the following components, with seals S between the components as necessary: the camber wall 301, the housing 302, the end cap 318, the outer bellows 316, the outer transition cap 310, the inner bellows 314, and the inner transition cup 308 (or the inner driven shaft 305). The device 300 shown in FIG. 3 is just one additional example of an arrangement for a dual coaxial rotary feedthrough device. Other configurations are similarly included herein by reference.

The inner and outer bellows 314, 316 are oriented to each other in a nested or bellows within a bellows arrangement. This has the effect of changing the overall shape factor of the device regarding length-to-diameter ratio necessary to achieve particular diametrical sizes of the two co-axial shafts. The embodiment shown in FIG. 3 is somewhat conceptual as the bearings have been shown only simply and additional bearings and improved placements would be required for added strength. This is achievable following the design approach shown in FIG. 1. The number and complexity of the components of construction for FIG. 3 design are roughly the same as the FIG. 1 design, and analogous names and functions are obvious when considering the description above. While not specifically shown, the technology of the present application is scalable to multiple shafts. In other words, it would be possible to add a third, fourth, or more concentric shafts.

Figure 4:
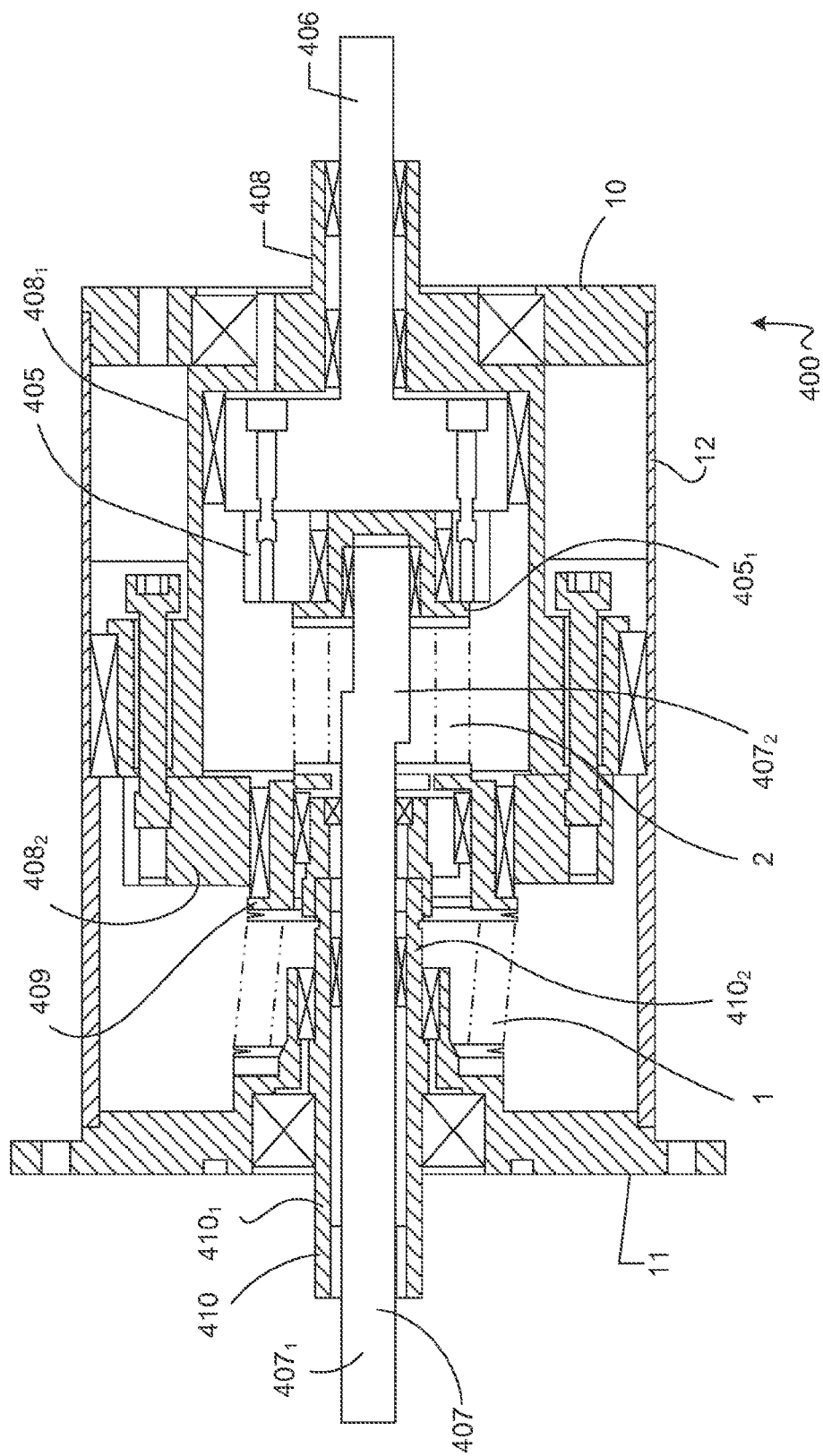
FIG. 4 depicts a cross sectional view of the feedthrough consistent with the technology of the present application.

The device 100 is generally used in conjunction with a vacuum chamber, but can be used at pressure as well, including pressures over atmospheric. In one presently contemplated application of the present technology, the environment 108 internal to the chamber 106 is generally at a lower pressure than the environment 112 external to the chamber 106. The higher pressure of the environment 112 external chamber 106 tends to provide a higher pressure interior to the bellows 1 and 2, which corresponding causes a force generally in the radially outward direction. In certain aspects this can cause bellows squirm (or twisting) and increased bellows spring rate. As mentioned above, however, the device 100 can be flipped such that the higher pressure is external to the bellows, which correspondingly causes a force generally in the radially inward direction. Externally, the device 400 shown in FIG. 4 looks similar to the device 100 and includes a mounting flange 11, a housing 12, and the end cap 10. The inner drive shaft 406 is formed with the inner transition cup 405 that is operatively coupled to the inner transition cap 405$_1$. The inner drive shaft 407 has an inner normal portion 407$_1$ and an inner eccentric portion 407$_2$. Similarly, the outer drive shaft 408 is formed with extensions cylinder 408$_1$ and outer transition cup 408$_2$. The outer transition cup 408$_2$ is operatively coupled to outer transition cap 409. The outer driven shaft 410 includes an eccentric portion 410$_1$ and a normal portion 410$_2$. The bellows 1 is coupled between the mounting flange 11 and the outer transition cap 409. The bellows 2 is coupled between the outer transition cap 409 and the inner transition cap 405$_1$. The offsets of the eccentric portions of the inner and outer shafts similarly can be but should not be equal to further reduce spring back. Orienting the device 400 as explained flips the pressure orientation such that the high pressure is external to the bellows 1 and 2, reducing or eliminating the bellows squirm described above.

Figure 5:
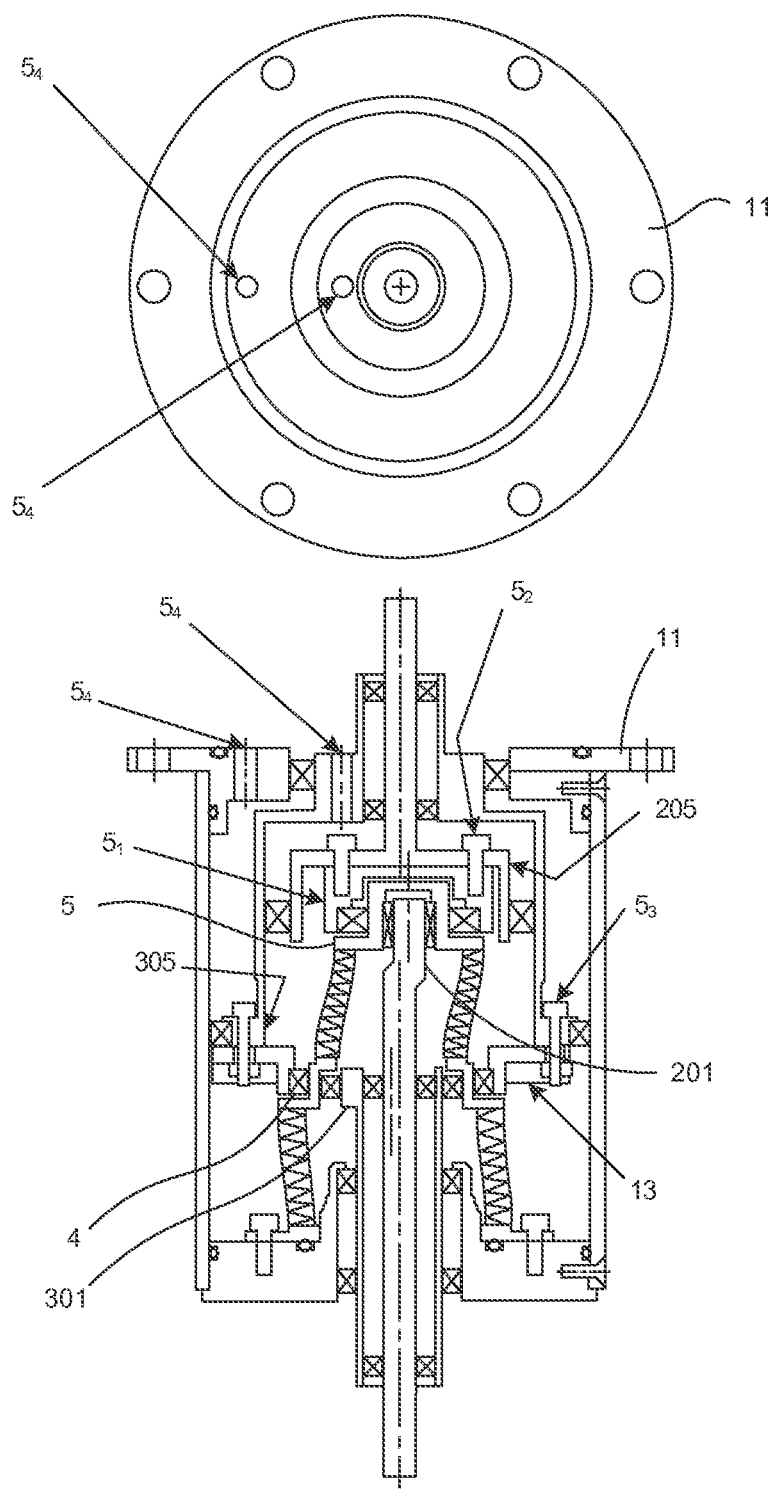
FIG. 5 depicts an elevation and cross sectional view of the feedthrough consistent with the technology of the present application.

As one of ordinary skill in the art would now recognize on reading the above description of the technology, the separate drive and driven shafts have a potential for rotational backlash. Backlash as used herein means, among other things, the ability of the drive and driven shafts to rotate independent of each other. More specifically, the backlash refers specifically to engineering backlash that results from clearance or lost motion due to gaps and interactions between components Generally, backlash between the drive and driven shafts (which may be referred to as a shaft set or a shaft pair herein) may be reduced by controlling the tolerances and fittaps between the various parts, such as the bearings, fittings, and the like. To reduce backlash, the components of the devices above should have as little clearance between fits as possible, such as, for example, by using shrink or interference press fits. Similarly, the bearings used should have little or no radial movement once installed. For example, the bearings may be preloaded or the balls may be tightly contained in the races. Additionally, using line to line and interference fits can reduce or eliminate backlash. However, even with strict control of the above tolerances, the offsets and eccentrics associated with the couplings as described may still provide for some backlash effects in certain embodiments. With reference now to FIG. 5, the device 100 is shown.

Figure 6:
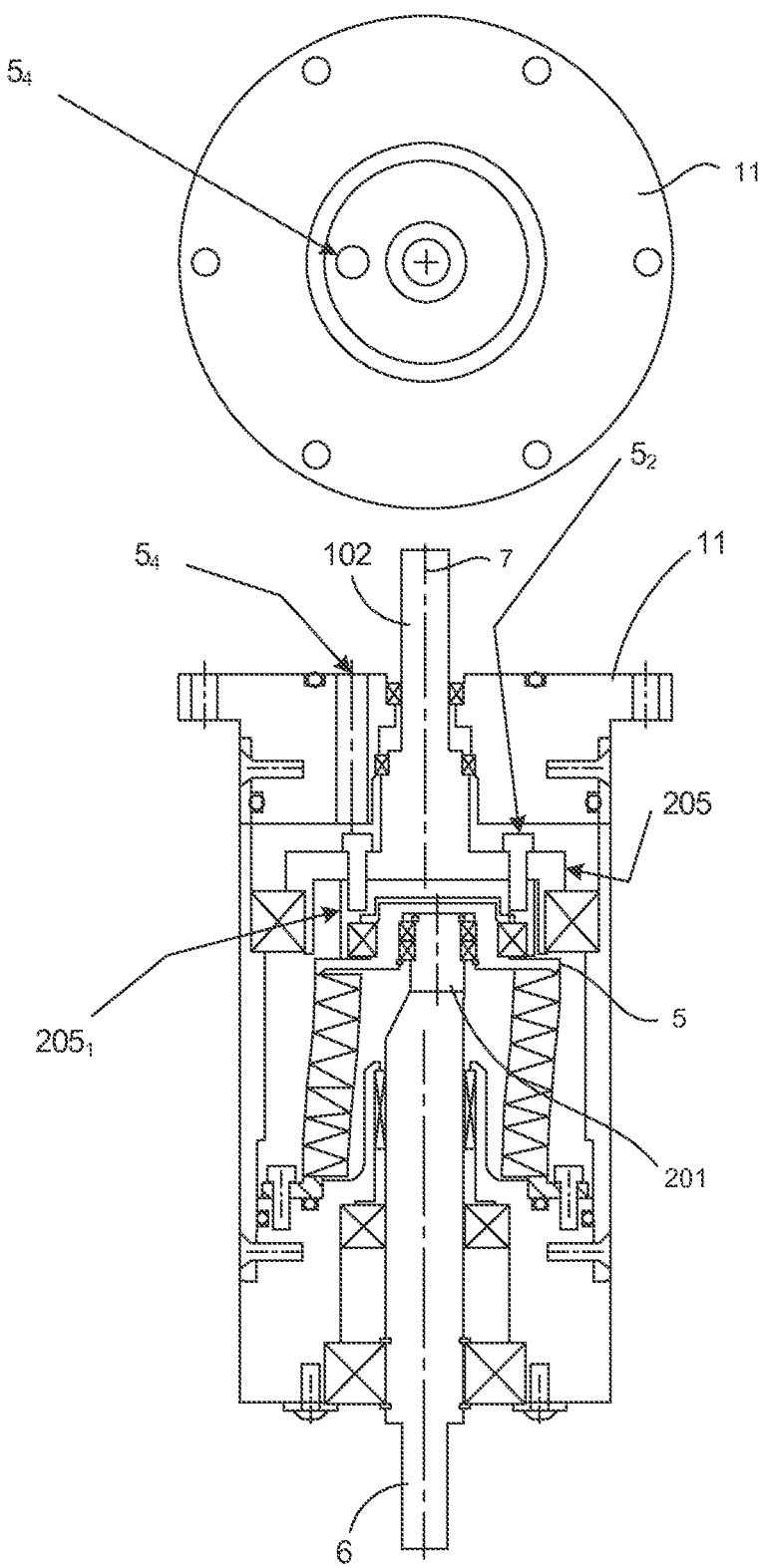
FIG. 6 depicts an elevation and cross sectional views of the feedthrough consistent with the technology of the present application.
Figure 7A:
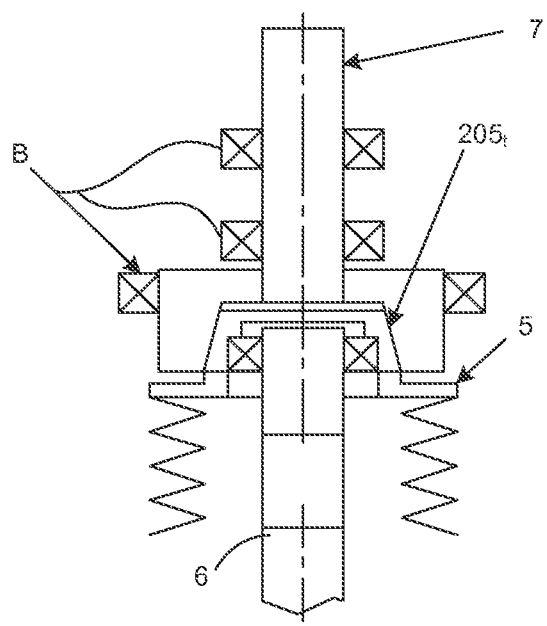
FIGS. 7a-7d depict perspective and cross sectional views of the coupling of the shafts consistent with the technology of the present application.
Figure 7B:
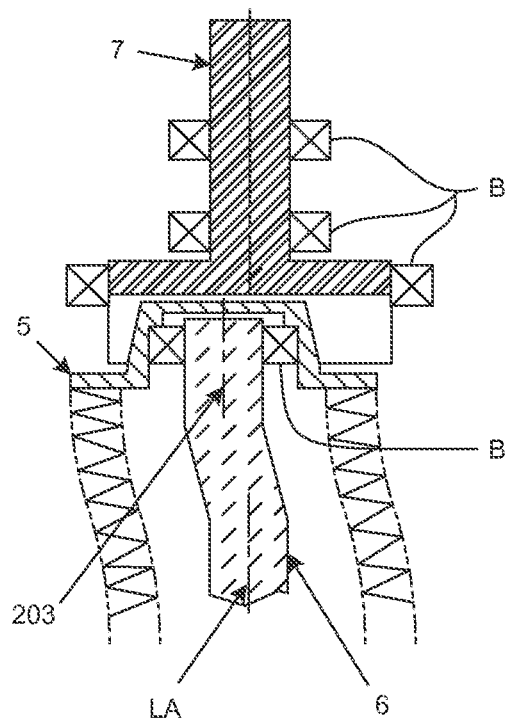
Figure 7C:
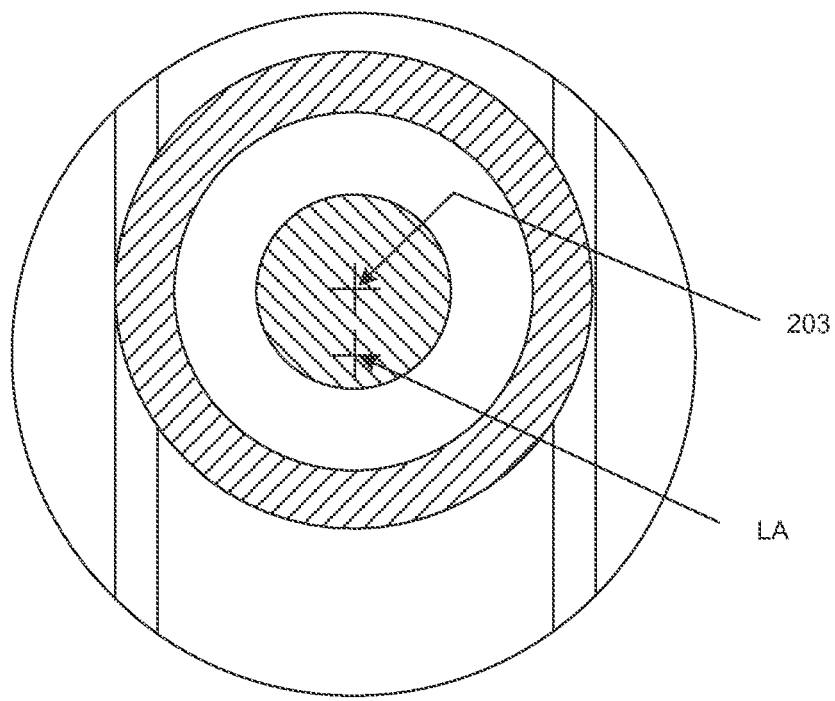
Figure 7D:
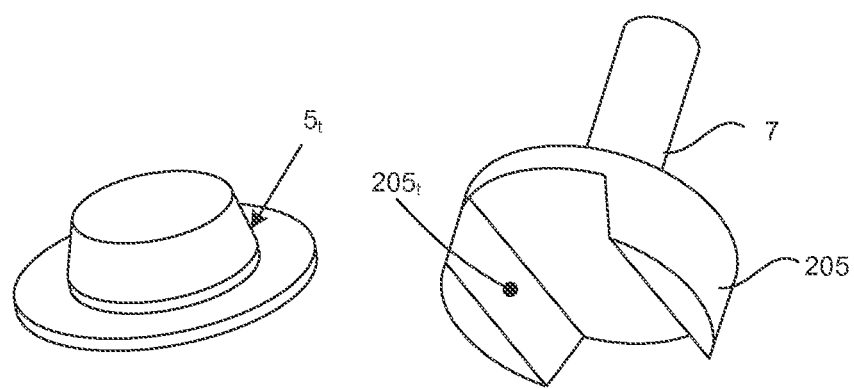

With specific regard to device 100, above, the coupling between the eccentric portion 201 of the inner drive shaft with the inner transition cap 5 and the coupling between the inner transition cap 5 and the inner transition cup 205 must be designed to limit the relative movement between the inner shaft set. The similar connection of the outer shaft pair similarly must be designed to limit the relative movement between the outer shaft pair. The coupling between the transition cap 5 and the transition cup 205 may be facilitated with an eccentric ring $5_1$ as shown in FIG. 5. The eccentric ring $5_1$ is allowed to float prior to fixation. Once the eccentric portion 201, the inner transition cap 5, and inner transition cup 205 are positioned and aligned, a plurality of fasteners $5_2$ may be tightened to fix the relative position of the inner transition cap 5 with respect to the inner transition cup 205. Similarly, the outer eccentric portion 301, outer transition cap 4, and the outer transition cup 305 including the eccentric ring 13 may be fastened with a plurality of fasteners $5_3$. To accommodate the tightening of the fasteners, the assemblies may be pre-fabricated. Alternatively, the mounting flange may have bolt access ports $5_4$. Providing the eccentric rings $5_1$ and 13 along with the fasteners $5_2$ and $5_3$ allow for partial disassembly once the device is constructed to allow for mechanical manipulation of the parts, via machining, drilling, reaming, etc. to further improve the fit and tolerances and/or further secure the fastenings between parts, with the device than being reassembled (i.e., match dowelling). As shown in FIG. 6, the above coupling device could be used in a single rotary feedthrough device 600. For purposes of comparison, the device 600 is assumed to have only the inner shaft components.

The inner and outer transition caps 5,4 and cups 205, 305 shown above are generally cylindrical in shape. FIGS. 7a-d show an alternative configuration of the transition caps and cups, for example, inner transition cap 5 and the corresponding inner transition cup 205 may comprise mating tapered walls. The inner transition cap 5 may form a frustoconical shape where the outer walls $5_t$ are tapered. The inner transition cup 205 would have matching inner tapered wall $205_t$ The matching tapers form a morris taper lock, which limits play between the parts and reduces any backlash. FIGS. 7a-d describe the technology with respect to the inner shaft 102, but the technology would equally apply to the outer shaft 104. The inner drive shaft 6 is coupled to the inner transition cap 5 via at least one bearing that is, preferably, preloaded as described above. The inner transition cap 5 with tapered outer walls $5_t$ is coupled to the inner transition cup 205 until the inner tapered walls $205_t$ form a taper lock. The inner transition cup 205 may incorporate the eccentric ring $205_1$ as described above. The inner tapered walls $205_t$ of the inner transition cup 205 form a slot allowing for a degree of freedom of motion between the cap and cup.

Figure 8:
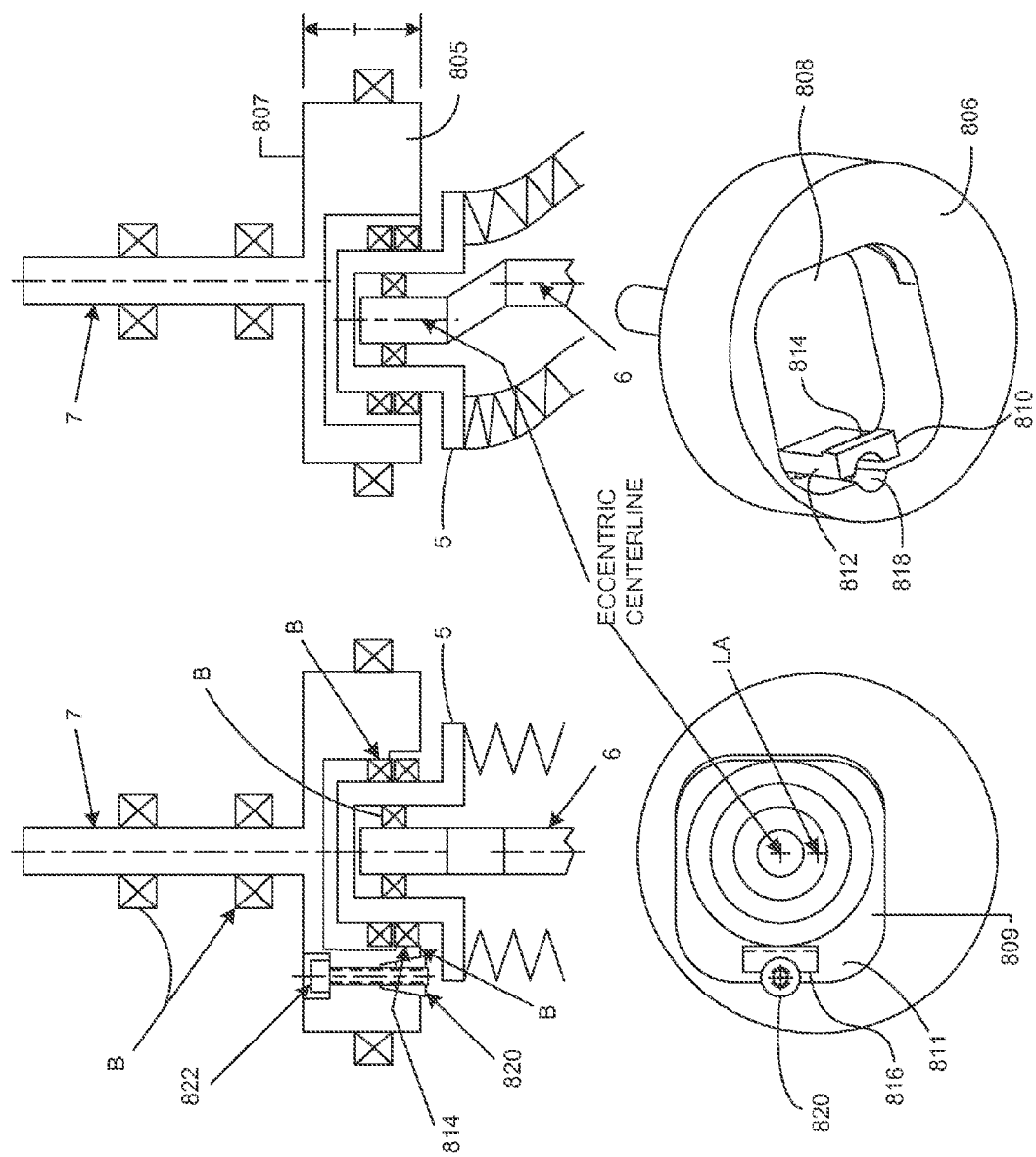
FIG. 8 depicts perspective and cross sectional views of another coupling of the shafts consistent with the technology of the present application.

FIG. 8 shows another inner transition cup 805 that is usable to reduce backlash between the drive and driven shafts. Again, while shown in relation to only the inner shaft 102, the technology of FIG. 8 would be equally applicable to outer shaft 104. The inner eccentric portion 201 of the inner drive shaft 6 is coupled to the inner transition cap 5 through at least one bearing B as described above. The inner transition cap 5 is coupled to the inner transition cup 805 through one or more bearings B as described above. The inner transition cup 805 is shown as a monolithic piece for convenience, but could be multiple parts. The inner transition cup 805 has a drive facing surface 806 and a driven facing surface 807 opposite the drive facing surface such that the inner transition cup 805 has a thickness into which a recess 808 is formed. The recess is offset or eccentric to the longitudinal axis LA to allow nutating movement. The recess 808 has an inner transition cap 5 and bearing B reception area 809 and a lock tab 810 in an lock tab area 811. The lock tab 810 includes a flexible body 812 and a bearing surface 814, which may protrude from the flexible body 812 as shown. A lock surface 816 opposite the bearing surface 814 forms a part of a bore 818. The other part of the bore 818 is formed in the inner transition cup 805 and extends from the drive facing surface 806 to the driven facing surface 807. A body 820, such as a wedge or cone, is coupled to a bolt 822. After the inner transition cap 5 is fitted into the recess 808, the bolt 822 is tightened to move the body 820 into the bore 818. The body 820 causes the flexible body 812 of lock tab 810 to flex inwardly until the bearing surface 814 contacts the bearings B.

Figure 9:
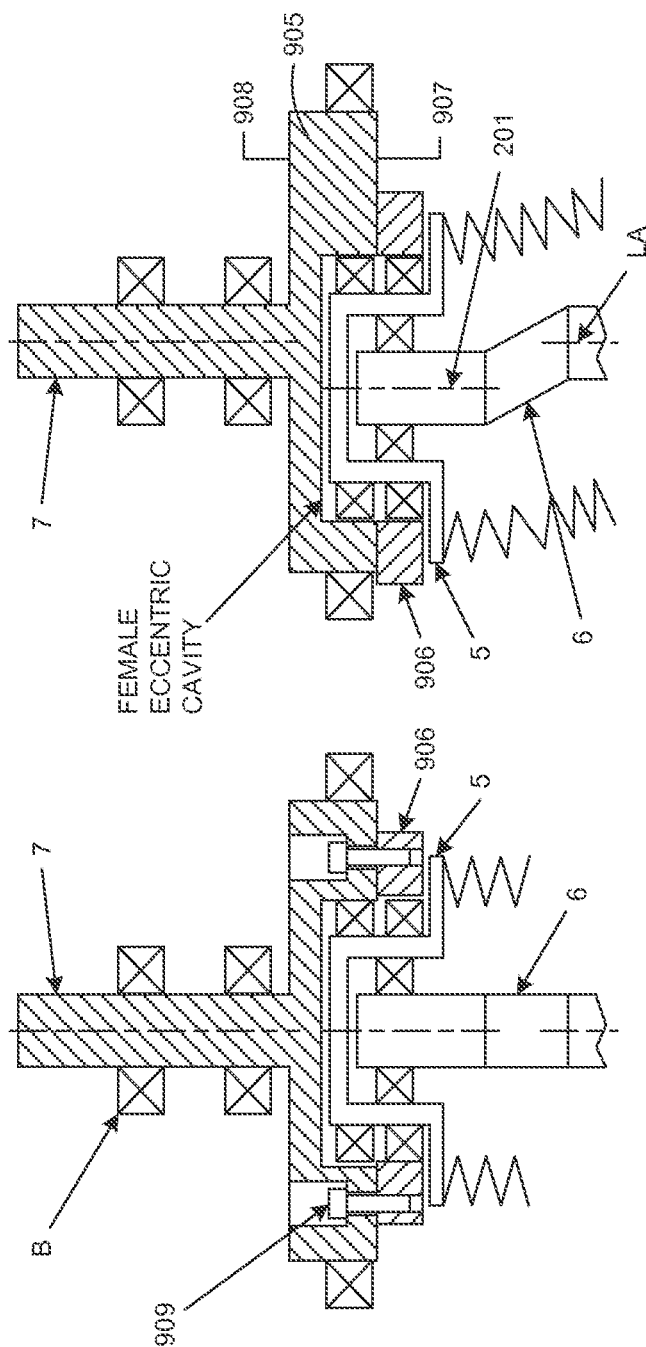
FIG. 9 depicts cross sectional views of another coupling of the shafts consistent with the technology of the present application.

FIG. 9 shows another configuration to reduce the backlash. FIG. 9 provides the inner drive shaft 6 and the eccentric portion 201 coupled to the inner transition cap 5 using a bearing similar to the above. The inner driven shaft 7 is connected to an inner transition cup 905, by either an integrated unit or a coupling. The inner transition cup 905 with a drive facing surface 907 and a driven facing surface 908. An eccentric recess 903 extends from the drive facing surface 907 part way to the driven facing surface 908. The inner transition cup 905 is coupled to the inner transition cap 5 via a bearing. A lock ring 906 is positionable on the drive facing surface 907 of the inner transition cup 905 and coupled to the inner transition cap 5 via another bearing. The lock ring 906 is loosely coupled to the drive facing surface 907 with fasteners 909, which fasteners may be tightened to lock the lock ring 906 in place. The inner transition cap 5 with a plurality of bearings B on the outer surface is positionable into the eccentric recess 903 of the inner transition cup 905 through the bore of the lock ring 906. With the drive and driven shafts 6, 7 fixed in place by, for example, a temporary housing, a lateral force is applied to the lock ring 906. The force moves the lock ring 906 until the lock ring 906 is flush with the upper bearing $B_u$. As the force is applied, the force is transmitted through the lock ring 906 and the upper bearing $B_u$ to cause the inner transition cap 5 to move laterally as well against the lower bearing $B_l$ until $B_l$ flush is with the wall of the eccentric recess 903. Once positioned, the fasteners 909 are tightened to maintain the position of the lock ring 906.

Figure 10:
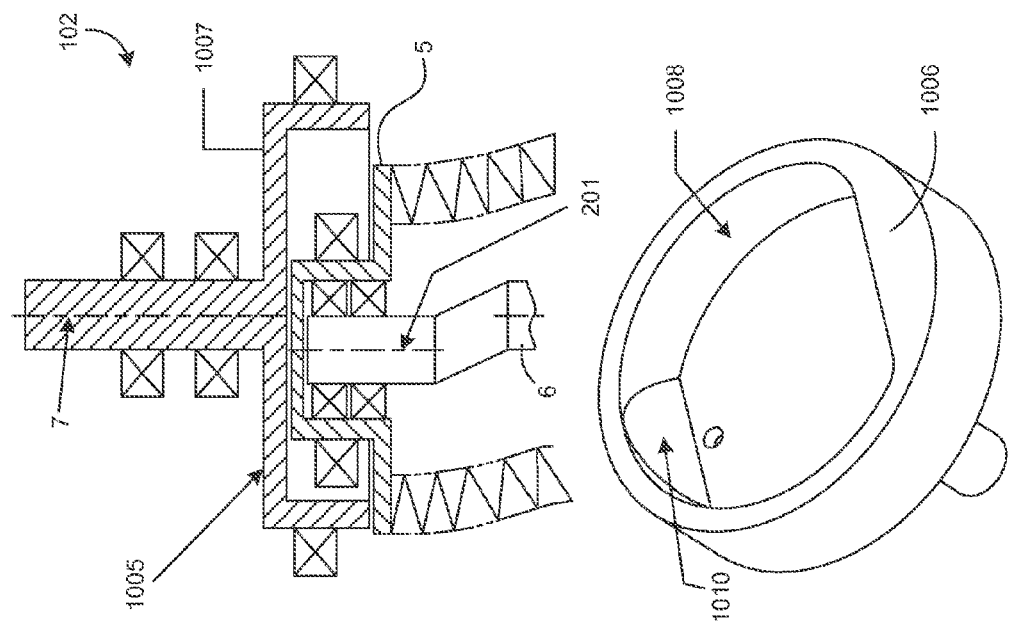
FIG. 10 depicts perspective and cross sectional views of another coupling of the shafts consistent with the technology of the present application.
Figure 10:
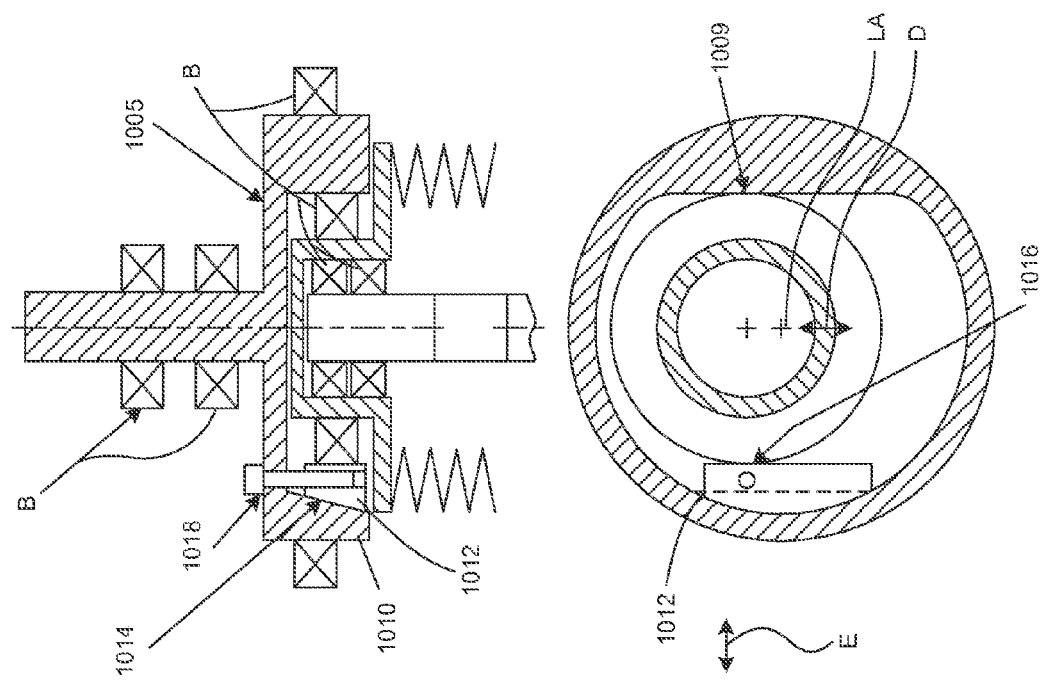

FIG. 10 shows still another configuration to reduce the backlash of the rotary feed through devices described above. As with the other embodiments above, the coupling disclosed in FIG. 10 is described with relation to the inner shaft 102 for simplicity, but is functional for the outer shaft 104 as well. The inner drive shaft 6 and the eccentric portion 201 of the inner drive shaft are coupled to the inner transition cap 5 through one or more bearings as explained above. The inner transition cap 5 is positioned in the inner transition cup 1005. The inner transition cup 1005 comprises a drive facing surface 1006 and a driven facing surface 1007 opposite the drive facing surface defining a thickness. A recess 1008 is formed in the transition cup 1005 to receive the transition cap 5. The recess 1008 has a keyed shape, in this case a flat contact surface 1009 such that the position of the transition cap 5 movable along the surface 1009. In the recess 1008 opposite the contact surface 1009 is a lock ramp 1010. A body member 1012 has a mating ramp surface 1014 and a lock surface 1016. A bolt 1018 is coupled to the body member 1012 such that tightening the bolt 1018 causes the body member 1012 to move inwardly until the lock surface 1016 grips the bearing and locks the inner transition cap 5 in the inner transition cup 1005. The Bearing can move along axis "D" once lock removes all play in the "E" direction. Thus, the inner transition cap 5 can move to match the eccentric offset but removes play.

Figure 11:
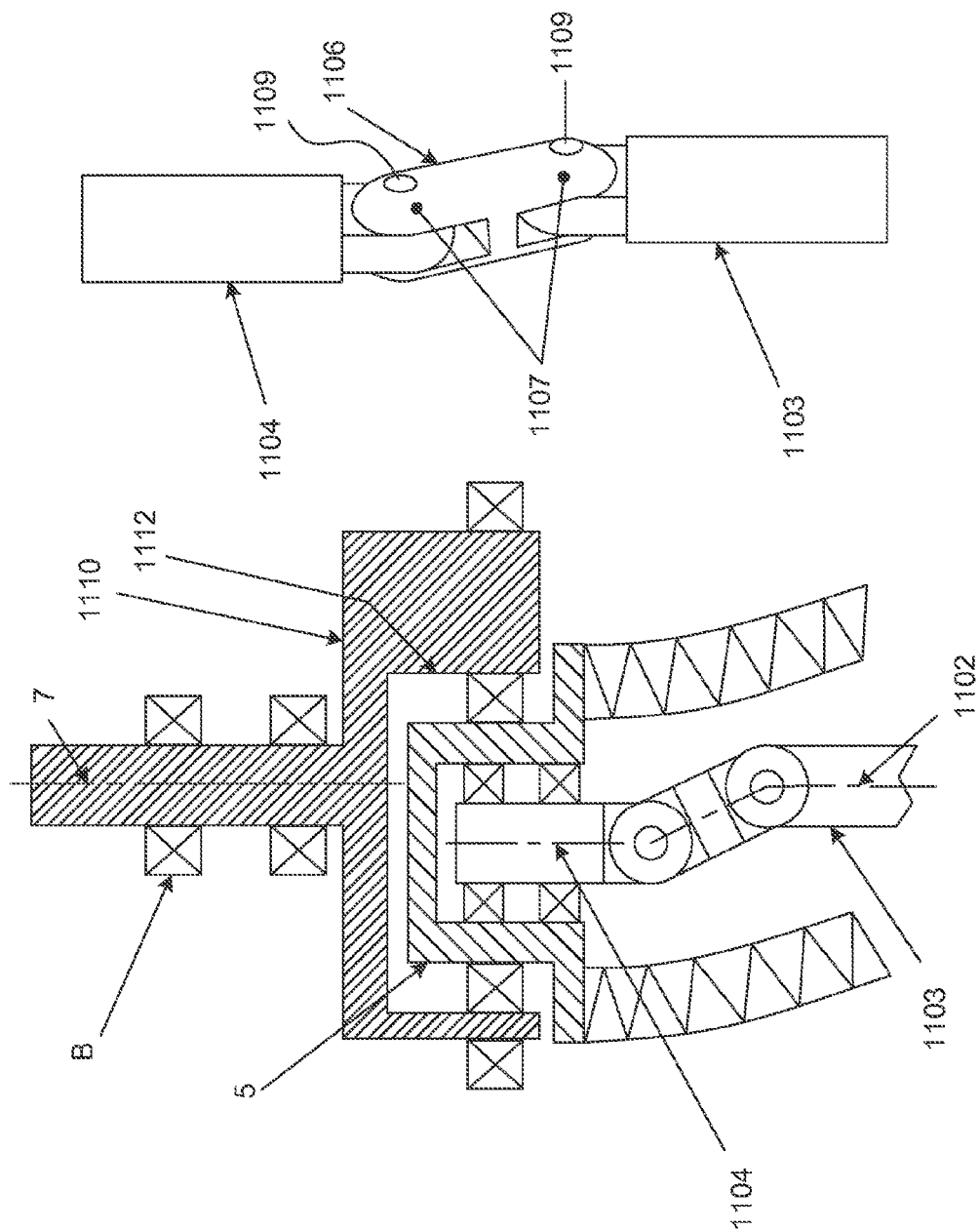
FIG. 11 depicts perspective and cross sectional views of another coupling of the shafts consistent with the technology of the present application.

FIG. 11 shows a separate embodiment of an inner shaft 1102. The inner shaft 1102 in this case has a normal portion 1103 and an eccentric portion 1104 coupled by a linkage 1106. The linkage 1106 comprises a rod with opposed devises 1107 to receive opposed ends 1108(1), 1108(2) of the normal portion 1103 and the eccentric portion 1104. Pins 1109 provide pivot points or axles to allow relative angular motion to allow eccentric portion 1104's centerline to match the eccentric offset of an eccentric recess 1112. Fits between pins 1108 and holes are tight to reduce or eliminate movement/play other than rotation of the joints. The eccentric portion 1104 is coupled to the inner transition cap 5 and the inner transition cap 5 is coupled to the inner transition cup 1110 as described above to allow for nutation of the inner shaft 1102. The inner transition cup 1110 is shown as a monolithic piece having the eccentric recess 1112.

Figure 12:
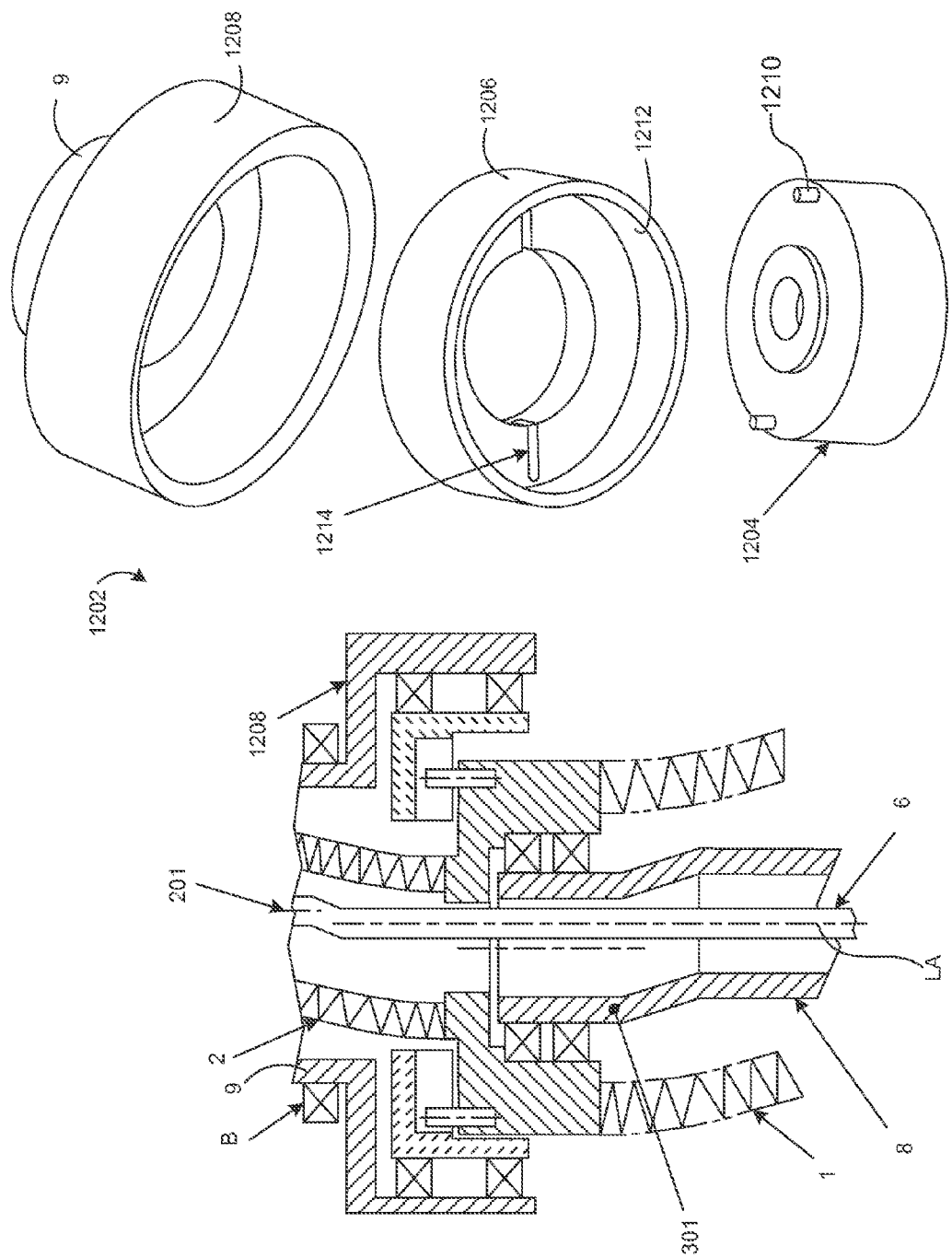
FIG. 12 depicts perspective and cross sectional views of another coupling of the shafts consistent with the technology of the present application.

FIG. 12 show another embodiment to allow coupling between the drive and driven shafts while minimizing backlash as described above. In this case, the outer shaft 104 is shown with a coupling 1202 between the eccentric portion 301 of the outer drive shaft 8 and the outer driven shaft 9. For orientation, the inner drive shaft 6 is shown. The coupling 1202 comprises a nesting of the outer transition cap 1204, a cap receiver 1206, and an outer transition cup 1208. The transition cap 1204 has protrusions 1210. The cap 1206 is sized with a cavity 1212 to receive the transition cap 1204 and allow for lateral displacement. The base of the cavity 1212 has grooves 1214 into which protrusions 1210 extend forming a tongue and groove rail. The fit between the protrusions 1210 and grooves 1214 is tight so as to allow only lateral motion along grooves 1214 and minimize other movements. The cap 1204 may be laterally displaced and fixed relative to the cavity 1212 of cap receiver 1206.

Although the technology has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A coaxial rotary feedthrough apparatus, comprising:
a housing comprising a first end, a second end opposite the first end, and at least one sidewall between the first end and the second end defining an interior, a first bore in the first end and a second bore in the second end;
an inner shaft comprising:
an inner drive shaft, the inner drive shaft extending from the second bore;
an inner driven shaft, the inner driven shaft extending from the first bore and comprising an inner normal portion having a longitudinal axis and an inner eccentric portion having an inner eccentric longitudinal axis offset from the longitudinal axis; and
an inner coupling residing in the interior connecting the inner drive shaft and the inner driven shaft wherein the inner driven shaft rotates with the inner drive shaft, the inner coupling comprising an inner transition cup coupled to the inner drive shaft, and an inner transition cap coupled to the inner driven shaft such that the inner drive shaft is nutatingly coupled to the inner driven shaft;
an outer shaft comprising:
a hollow outer drive shaft coaxial to and encompassing the inner drive shaft, the hollow outer drive shaft extending from the second bore;
a hollow outer driven shaft coaxial to and encompassing the inner driven shaft, the outer driven shaft extending from the first bore and comprising an outer normal portion having the longitudinal axis and an outer eccentric portion having an outer eccentric longitudinal axis; and
an outer coupling residing in the interior connecting the outer drive shaft and the outer driven shaft wherein the outer driven shaft rotates with the outer drive shaft, the outer coupling comprising an outer transition cup coupled to the outer drive shaft, and an outer transition cap coupled to the outer driven shaft such that the outer drive shaft is nutatingly coupled to the outer driven shaft; and
a barrier separating the first bore from the second bore wherein the barrier comprises a first bellows operationally coupled to the inner transition cup and the outer transition cap and a second bellows operationally coupled to the outer transition cap and the first end.

2. The apparatus of claim 1 wherein the housing comprises:
a mounting flange having a radially extending flanged surface and a radial base;
an end cap at the second end; and
the at least one sidewall comprises a single cylindrical sidewall sized to encircle the radial base and the end cap.

3. The apparatus of claim 1 wherein the inner drive shaft extends a first distance from the second bore and the outer drive shaft extends a second distance from the second bore wherein the second distance is less than the first distance.

4. The apparatus of claim 3 wherein the inner driven shaft extends a third distance from the first bore and the outer driven shaft extends a fourth distance from the first bore wherein the fourth distance is less than the third distance.

5. The apparatus of claim 1 wherein at least one of the outer or inner transition cup comprises a cylindrical extension and an eccentric ring coupled to the cylindrical extension.

6. The apparatus of claim 5 wherein the eccentric ring is nutatingly coupled to the corresponding outer or inner transition cap in part via bearings.

7. The apparatus of claim 6 wherein the transition cap is nutatingly coupled to the corresponding outer or inner eccentric portion of the corresponding outer or inner drive shaft in part via bearings.

8. The apparatus of claim 1 wherein the inner transition cup has a drive facing surface and a driven facing surface opposite the drive facing surface defining a thickness and wherein a recess is formed in the driven facing surface to receive the inner transition cap.

9. The apparatus of claim 8 wherein the recess comprises a slot traversing the inner transition cap and wherein the slot comprises tapered inner surfaces and the inner transition cup comprises tapered outer surfaces that are tapered to mate with the tapered inner surfaces.

10. The apparatus of claim 8 wherein the recess comprises a flexible tab extending from a base of the recess and a body member resides between the flexible tab and a wall of the recess such that movement of the body member causes the flexible tab to move laterally to lock the inner transition cap.

11. The apparatus of claim 8 further comprising an inner eccentric ring positionable on the driven facing surface of the inner transition cup such that the inner eccentric ring locks the inner transition cap.

12. The apparatus of claim 1 further comprising a linkage coupling the inner normal portion to the inner eccentric portion.

13. The apparatus of claim 1 wherein the inner eccentric longitudinal axis is offset from the longitudinal axis a distance different than the outer eccentric longitudinal axis is offset from the longitudinal axis.

14. A coaxial rotary feedthrough apparatus, comprising:
 a housing comprising a first end, a second end opposite the first end, and at least one sidewall extending between the first end and the second end defining an interior, a first bore in the first end and a second bore in the second end;
 an inner shaft comprising:
  an inner drive shaft, the inner drive shaft extending from the second bore and comprising an inner normal portion having a longitudinal axis and an inner eccentric portion having an inner eccentric longitudinal axis offset from the longitudinal axis;
  an inner driven shaft, the inner driven shaft extending from the first bore; and
  an inner coupling residing in the interior connecting the inner drive shaft and the inner driven shaft wherein the inner driven shaft rotates with the inner drive shaft, the inner coupling comprising an inner transition cup coupled to the inner driven shaft, and an inner transition cap coupled to the inner drive shaft such that the inner transition cup is nutatingly coupled to the inner transition cap;
 an outer shaft comprising:
  a hollow outer drive shaft coaxial and encompassing the inner drive shaft, the hollow outer drive shaft extending from the second bore and comprising an outer normal portion having the longitudinal axis and an outer eccentric portion having an outer eccentric longitudinal axis;
  a hollow outer driven shaft coaxial and encompassing the inner driven shaft, the outer driven shaft extending from the first bore;
  an outer coupling residing in the interior connecting the outer drive shaft and the outer driven shaft wherein the outer driven shaft rotates with the outer driven shaft, the outer coupling comprising an outer transition cup coupled to the outer driven shaft, and an outer transition cap coupled to the outer drive shaft such that the outer transition cup is nutatingly coupled to the outer transition cap; and
 a barrier separating the first bore from the second bore, the barrier comprising at least a first bellows encompassing the hollow outer driven shaft and coupled to the second end and the outer transition cap and a second bellows encompassing the inner driven shaft and coupled to the outer transition cap and the inner transition cap.

15. The apparatus of claim 14 wherein the barrier further comprises:
 the first end;
 the at least one sidewall;
 the second end;
 the outer transition cap; and
 the inner transition cap.

* * * * *